(12) United States Patent
Lin

(10) Patent No.: US 9,506,599 B2
(45) Date of Patent: Nov. 29, 2016

(54) DISPLAY DEVICE

(71) Applicants: BOE TECHNOLOGY GROUP, CO., LTD., Beijing (CN); K-TRONICS (SU ZHOU) TECHNOLOGY CO., LTD., Suzhou, Jiangsu Province (CN)

(72) Inventor: Jen Sheng Lin, Beijing (CN)

(73) Assignees: BOE TECHNOLOGY GROUP CO., LTD., Beijing (CN); K-TRONICS (SU ZHOU) TECHNOLOGY CO., LTD., Suzhou, Jiangsu Province (CN)

(*) Notice: Subject to any disclaimer, the term of this patent is extended or adjusted under 35 U.S.C. 154(b) by 0 days.

(21) Appl. No.: 14/761,798

(22) PCT Filed: Oct. 10, 2014

(86) PCT No.: PCT/CN2014/088297
§ 371 (c)(1),
(2) Date: Jul. 17, 2015

(87) PCT Pub. No.: WO2016/000345
PCT Pub. Date: Jan. 7, 2016

(65) Prior Publication Data
US 2016/0258569 A1    Sep. 8, 2016

(30) Foreign Application Priority Data

Jun. 30, 2014 (CN) .......................... 2014 2 0356380

(51) Int. Cl.
| | | |
|---|---|---|
| *A47B 97/00* | (2006.01) | |
| *F16M 11/04* | (2006.01) | |
| *F16M 11/08* | (2006.01) | |

(52) U.S. Cl.
CPC ............ *F16M 11/041* (2013.01); *F16M 11/08* (2013.01); *A47B 2097/005* (2013.01)

(58) Field of Classification Search
None
See application file for complete search history.

(56) References Cited

U.S. PATENT DOCUMENTS

| | | | | |
|---|---|---|---|---|
| 5,923,528 A * | 7/1999 | Lee ........................ | F16M 11/04 | |
| | | | 248/291.1 | |
| 7,193,843 B2 * | 3/2007 | Hsu ........................ | F16M 11/24 | |
| | | | 248/371 | |
| 7,766,297 B2 * | 8/2010 | Chih ...................... | F16M 11/04 | |
| | | | 248/349.1 | |
| 7,922,133 B2 * | 4/2011 | Hsu ........................ | F16M 11/10 | |
| | | | 248/127 | |

(Continued)

FOREIGN PATENT DOCUMENTS

| | | |
|---|---|---|
| CN | 202056477 U | 11/2011 |
| CN | 202514187 U | 10/2012 |

(Continued)

OTHER PUBLICATIONS

Written Opinion of the International Searching Authority mailed Mar. 25, 2015; PCT/C2014/088297.

*Primary Examiner* — Xanthia C Cunningham
(74) *Attorney, Agent, or Firm* — Ladas & Parry LLP

(57) ABSTRACT

A display device is provided, the display device comprises a housing and a support stand for supporting the housing, and a mounting seat is provided on the housing. The display device further comprises a rotating component, the rotating component comprises a connecting piece and a hanging piece rotationally connected with the connecting piece, the connecting piece is fixed on the support stand, and the hanging piece is detachably mounted on the mounting seat.

17 Claims, 3 Drawing Sheets

(56) References Cited

U.S. PATENT DOCUMENTS

| | | | | |
|---|---|---|---|---|
| 8,020,821 B2* | 9/2011 | Chen | ............ | F16M 11/16 248/220.22 |
| 8,908,363 B2* | 12/2014 | Lin | ............ | H05K 5/0226 361/679.21 |
| 2004/0084585 A1* | 5/2004 | Watanabe | ............ | F16M 11/10 248/276.1 |
| 2006/0175476 A1* | 8/2006 | Hasegawa | ............ | F16M 11/10 248/125.1 |
| 2006/0219849 A1* | 10/2006 | Chiu | ............ | F16M 11/04 248/125.8 |
| 2007/0097617 A1* | 5/2007 | Searby | ............ | F16M 11/04 361/679.4 |
| 2009/0166495 A1* | 7/2009 | Hung | ............ | F16M 11/08 248/289.11 |
| 2011/0058322 A1* | 3/2011 | Lee | ............ | F16M 11/04 361/679.01 |
| 2011/0075350 A1 | 3/2011 | Lindblad et al. | | |
| 2012/0243196 A1* | 9/2012 | Lee | ............ | F16M 11/10 361/807 |
| 2012/0250233 A1* | 10/2012 | Lee | ............ | F16M 11/10 361/679.01 |
| 2013/0048811 A1* | 2/2013 | Tseng | ............ | F16M 11/10 248/220.21 |
| 2014/0146508 A1* | 5/2014 | Charlton | ............ | F16M 11/10 361/807 |
| 2014/0175253 A1* | 6/2014 | Huang | ............ | F16M 11/105 248/558 |
| 2015/0076307 A1* | 3/2015 | Tsai | ............ | F16M 11/14 248/397 |
| 2015/0097102 A1* | 4/2015 | Cassidy | ............ | A47B 85/00 248/558 |
| 2015/0257299 A1* | 9/2015 | Su | ............ | A47B 97/00 361/679.01 |
| 2015/0296984 A1* | 10/2015 | Fan | ............ | A47B 97/00 108/42 |
| 2016/0007489 A1* | 1/2016 | Huang | ............ | F16M 11/22 361/679.01 |

FOREIGN PATENT DOCUMENTS

| | | |
|---|---|---|
| CN | 103604029 A | 2/2014 |
| JP | 2008-046435 A | 2/2008 |

* cited by examiner

DISPLAY DEVICE

TECHNICAL FIELD

Embodiments of the disclosure relate to a display device.

BACKGROUND

Liquid crystal display device has gradually replaced the traditional cathode ray tube display device due to its advantages such as light weight, small thickness, no radiation and so on. When the liquid crystal display device leaves factory, the liquid crystal display device is separately packaged in order to be better transported and reduce transportation cost. If the liquid crystal display device is integrally packaged, not only an overall package volume is increased and the transportation cost is increased, but also the liquid crystal panel of the liquid crystal display device can not be effectively protected.

Generally, the liquid crystal display device comprises a housing for mounting a circuit board, a support stand and a base; the support stand is mounted on the base, a rotating component is provided on the support stand so that viewing angle of the liquid crystal display panel is adjusted by rotating the rotating component; a mounting seat for connecting the support stand is provided on the housing, and the rotating component is fixed on the mounting seat by a plurality of screws. However, the housing and the rotating component of the liquid crystal display device cannot be conveniently disassembled form each other; due to fixing by a plurality of screws, parts used for assembling are numerous, so the assembly cannot be quick and effort-saving, resulting in low assembly efficiency and high production cost.

SUMMARY

According to embodiments of the present disclosure, there is provided a display device. The display device comprises a housing and a support stand for supporting the housing, a mounting seat is provided on the housing. The display device further comprises a rotating component, the rotating component comprises a connecting piece and a hanging piece rotationally connected with the connecting piece, the connecting piece is fixed on the support stand, and the hanging piece is detachably mounted on the mounting seat.

For example, a hook portion is provided on the mounting seat, a hole portion is formed on the hanging piece, and the hook portion is connected with the hole portion in a buckling manner.

For example, a slot is provided on the mounting seat, the slot is provided on both sides of the hook portion, an insertion portion is provided on the hanging piece, and the insertion portion is plugged into the slot.

For example, the slot is of a T-type.

For example, a button is provided on the mounting seat, and the button is configured for driving the hook portion to move so that the hook portion is separated from the hole portion.

For example, the button is provided above the hook portion.

For example, a mask for securing a circuit board mounted inside the housing is mounted inside the housing, the mask is provided with a spring sheet disposed corresponding to the hook portion, and the spring sheet is configured for maintaining elasticity of the hook portion.

For example, a stop piece is provided on the mask, and the stop piece is provided above the spring sheet and is configured for preventing deformation of the button.

For example, the connecting piece is fixed on one end of the support stand by screws, and the other end of the support stand is mounted on a base.

For example, the connecting piece is rotationally connected with the hanging piece via a rotating shaft.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DESCRIPTION OF THE EMBODIMENTS

Figure 1:
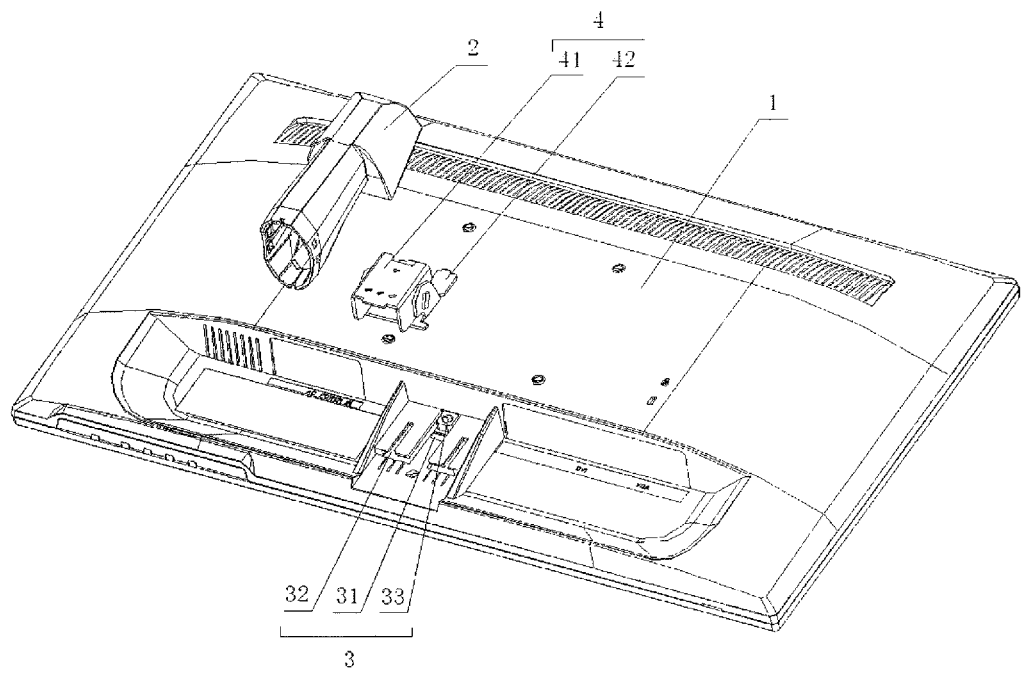
FIG. 1 is an exploded view illustrating a display device according to Embodiment I of the present disclosure.

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

In the description of the embodiments of the present disclosure, unless otherwise specified, "a plurality of" refers to two or more; azimuth or positional relationships indicated by terms such as "up", "down", "left", "right", "inside", "outside", "front-end", "back-end", "head", "tail" and so on, are azimuth or positional relationships shown in the drawings, which are only to facilitate description of the embodiments of the present disclosure and simplify the description, but not to indicate or imply that devices or components must have a specific azimuth, or be constructed or operated in the specific azimuth, which thus cannot be understood as a limitation to the embodiments of the present disclosure. Furthermore, the terms such as "first", "second", "third" and so on are only used for descriptive purposes, and cannot be construed as indicating or implying relative importance.

In the description of the embodiments of the present disclosure, it should be noted that, unless otherwise clearly defined and limited, terms such as "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. Those skilled in the art can understand the specific meanings of the above-mentioned terms in the embodiments of the present disclosure according to the specific circumstances.

Embodiment I

As shown in FIG. 1, a display device according to Embodiment I comprises a housing 1 and a support stand 2 for supporting the housing 1, and a mounting seat 3 is provided on the housing 1. The display device further comprises a rotating component 4, the rotating component 4 comprises a connecting piece 41 and a hanging piece 42 rotationally connected with the connecting piece 41, the connecting piece 41 is fixed on the support stand 2, and the hanging piece 42 is detachably mounted on the mounting seat 3. The support stand 2 and the mounting seat 3 are detachably connected by the rotating component 4, so that quick disassembly between the housing 1 and the support stand 2 is achieved and the time for assembly is reduced. Furthermore, the viewing angle of the display device is adjusted by the rotating component 4.

Figure 3:
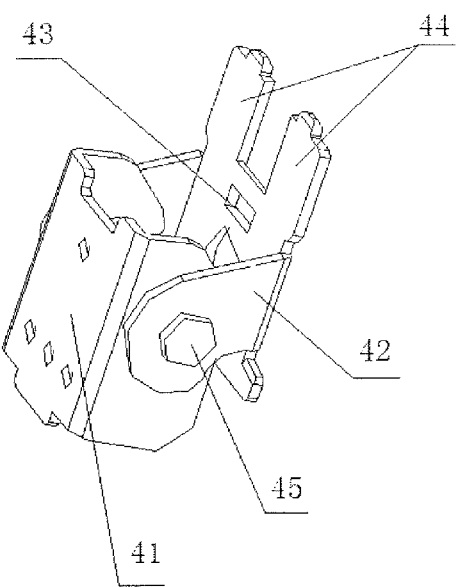
FIG. 3 is a structural schematic view illustrating a rotating component according to Embodiment I of the present disclosure.

For example, the mounting seat 3 is provided with a hook portion 31 detachably connected with the hanging piece 42. Correspondingly, as shown in FIG. 3, a hole portion 43 is provided on the hanging piece 42, and the hole portion 43 is connected with the hook portion 31 in a buckling manner, which is simple in structure and easy in disassembly.

Further, a slot 32 is provided on the mounting seat 3, and the slot 32 is provided on both sides of the hook portion 31. As shown in FIG. 3, an insertion portion 44 disposed corresponding to the slot 32 is provided on the hanging piece 42, and the insertion portion 44 is provided on both sides of the hole portion 43 so as to be plugged into the slot 32. The insertion portion 44 is detachably plugged into the slot 32 while the hook portion 31 and the hole portion 43 are connected in the buckling manner, which is not only convenient to disassembly but also increases firmness of connection between the housing 1 and the hanging piece 42.

For example, the slot 32 is of a T-type, to make a connection between the hanging piece 42 and the mounting seat 3 more compact and stable. It should be noted that it is only required that the main body of the slot 32 is in the T shape; for example, the slot 32 may be provided with structures or shapes of other ancillary functions as long as the main body thereof presents a T-shaped structure to firmly connect the hanging piece 42 and the mounting seat 3.

Furthermore, in the case that the hook portion 31 and the hole portion 43 are disassembled from each other, for convenience of operation, the mounting seat 3 is additionally provided with a button 33; the button 33, the mounting seat 3 and the housing 1 are integrally connected. By pressing the button 33, the hook portion 31 is driven to move, realizing separation of the buckling connection between the hook portion 31 and the hole portion 43, achieving a purpose of quick disassembly, and effectively improving the assembly efficiency by using the button 33.

Figure 2:
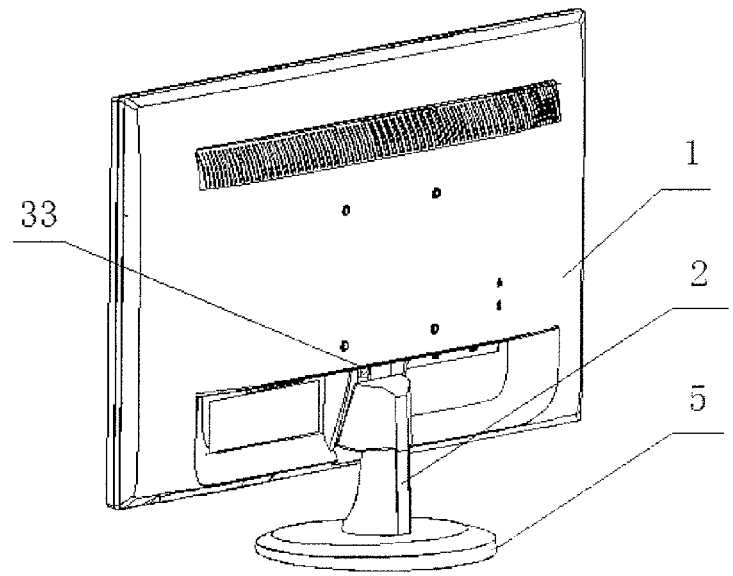
FIG. 2 is a structural schematic view illustrating the display device according to Embodiment I of the present disclosure.

For example, as shown in FIG. 2 and FIG. 3, the button 33 is provided above the hook portion 31, and is exposed at a connection portion between the support stand 2 and the mounting seat 3. It is conducive to fast pressing the button 33, for realizing fast disassembly, reducing the number of parts to be assembled, and saving the production cost.

The rotating component 4 comprises the connecting piece 41 and the hanging piece 42 rotationally connected with the connecting piece 41. In the case that the connecting piece 42 is assembled with the support stand 2, the connecting piece 41 for example is fixed on one end of the support stand 2 by screws; meanwhile the other end of the support stand 2 is mounted on a base 5, and the display device is more firmly supported by the base 5.

There are various ways to rotationally connect the connecting piece 41 and the hanging piece 42. For example, the connecting piece 41 and the hanging piece 42 are rotationally connected with each other via a rotating shaft 45, thereby effectively adjusting the viewing angle of the display device.

Embodiment II

Figure 4:
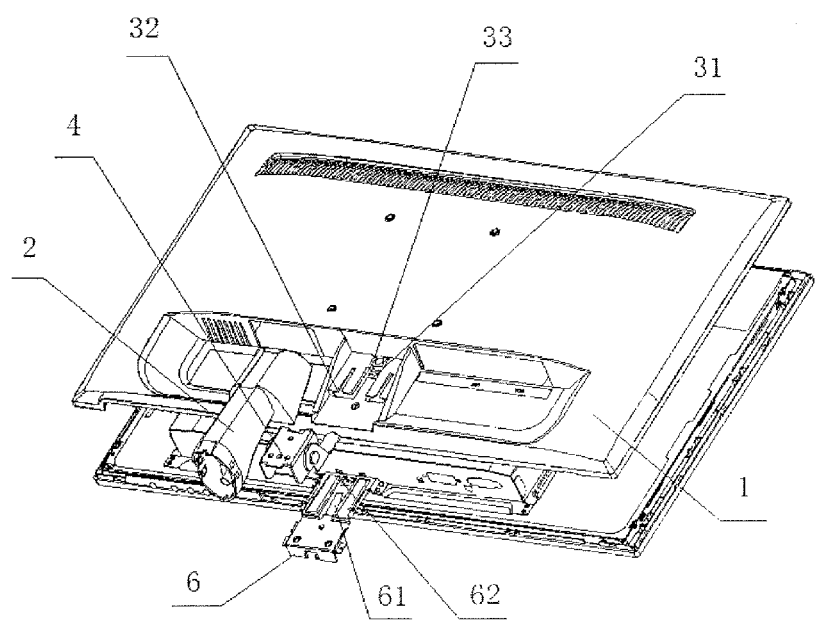
FIG. 4 is an exploded view illustrating a display device according to Embodiment II of the present disclosure.

The structure of the display device of Embodiment II same as that of Embodiment I will not be repeated, the disclosure of Embodiment I also belongs to the disclosure of Embodiment II, and Embodiment II only differs from Embodiment I in that: as shown in FIG. 4, a mask 6 for securing a circuit board mounted inside the housing 1 is mounted inside the housing 1, the mask 6 is provided with a spring sheet 61 disposed corresponding to the hook portion 31. Besides, a stop piece 62 is provided on the mask 6, and the stop piece 62 is provided above the spring sheet 61.

Figure 5:
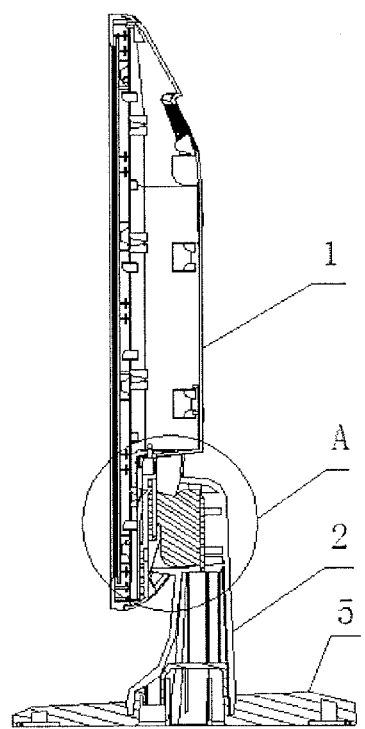
FIG. 5 is a cross-sectional view illustrating the display device according to Embodiment II of the present disclosure.
Figure 6:
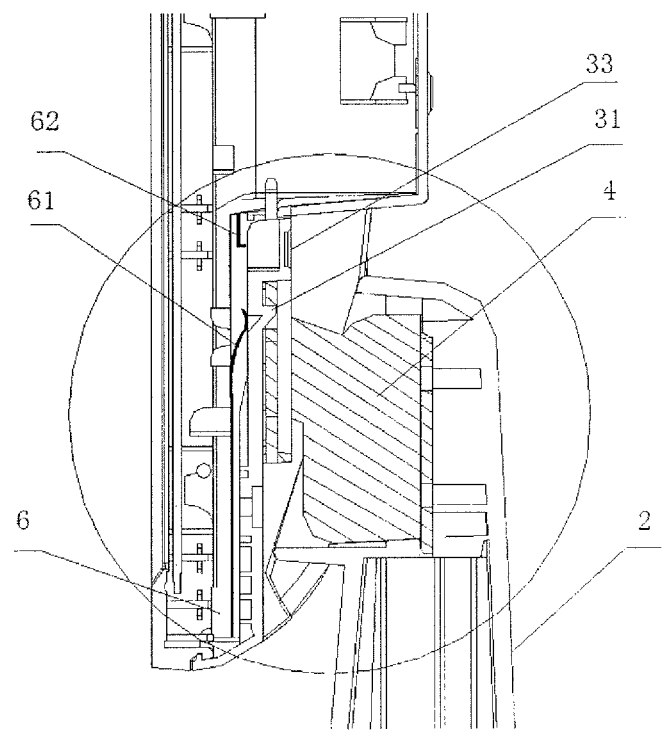
FIG. 6 is an enlarged schematic view illustrating portion A in FIG. 5.

In order to better describe the spring sheet 61 and the stop piece 62, as shown in FIG. 5 and FIG. 6, the mask 6 is provided inside the housing 1, the spring sheet 61 provided on the mask 6 is of an arc-shaped structure and stands up to the bottom of the hook portion 31 in the housing 1 from inside to outside, to maintain and enhance elasticity of the hook portion 31. The stop piece 62 provided on the mask 6 is corresponding to the bottom of the button 33 to prevent deformation of the button 33.

In the display device according to the embodiments of the disclosure, the housing is provided with the mounting seat, the support stand is detachably mounted on the mounting seat via the rotating component, the rotating component comprises the connecting piece fixed on the support stand and the hanging piece detachably mounted on the mounting seat, so that quick disassembly between the housing and the support stand is realized; the viewing angle of the display device is adjusted by the rotating connection between the connecting piece and the hanging piece; the mounting seat is provided with the hook portion, the hanging piece is provided with the hole portion, the hook portion and the hole portion are connected in the buckling manner, thereby saving time to assemble parts and reducing the number of parts to be assembled, improving the work efficiency, and effectively reducing the production cost.

The foregoing embodiments merely are exemplary embodiments of the disclosure, and not intended to define the scope of the disclosure, and the scope of the disclosure is determined by the appended claims.

The present application claims priority of Chinese Patent Application No. 201420356380.8 filed on Jun. 30, 2014, the disclosure of which is incorporated herein by reference in its entirety as part of the present application.

What is claimed is:

1. A display device, comprising a housing and a support stand for supporting the housing, a mounting seat being provided on the housing, wherein
the display device further comprises a rotating component, the rotating component comprises a connecting piece and a hanging piece rotationally connected with the connecting piece, the connecting piece is fixed on the support stand, and the hanging piece is detachably mounted on the mounting seat;

wherein a hook portion is provided on the mounting seat, a hole portion is formed on the hanging piece, and the hook portion is connected with the hole portion in a buckling manner.

2. The display device according to claim 1, wherein a slot is provided on the mounting seat, the slot is provided on both sides of the hook portion, an insertion portion is provided on the hanging piece, and the insertion portion is plugged into the slot.

3. The display device according to claim 2, wherein the slot is of a T-type.

4. The display device according to claim 3, wherein a mask for securing a circuit board mounted inside the housing is mounted inside the housing, the mask is provided with a spring sheet disposed corresponding to the hook portion, and the spring sheet is configured for maintaining elasticity of the hook portion.

5. The display device according to claim 4, wherein a stop piece is provided on the mask, and the stop piece is provided above the spring sheet and is configured for preventing deformation of the button.

6. The display device according to claim 2, wherein a mask for securing a circuit board mounted inside the housing is mounted inside the housing, the mask is provided with a spring sheet disposed corresponding to the hook portion, and the spring sheet is configured for maintaining elasticity of the hook portion.

7. The display device according to claim 6, wherein a stop piece is provided on the mask, and the stop piece is provided above the spring sheet and is configured for preventing deformation of the button.

8. The display device according to claim 1, wherein a button is provided on the mounting seat, and the button is configured for driving the hook portion to move so that the hook portion is separated from the hole portion.

9. The display device according to claim 8, wherein the button is provided above the hook portion.

10. The display device according to claim 9, wherein a mask for securing a circuit board mounted inside the housing is mounted inside the housing, the mask is provided with a spring sheet disposed corresponding to the hook portion, and the spring sheet is configured for maintaining elasticity of the hook portion.

11. The display device according to claim 10, wherein a stop piece is provided on the mask, and the stop piece is provided above the spring sheet and is configured for preventing deformation of the button.

12. The display device according to claim 8, wherein a mask for securing a circuit board mounted inside the housing is mounted inside the housing, the mask is provided with a spring sheet disposed corresponding to the hook portion, and the spring sheet is configured for maintaining elasticity of the hook portion.

13. The display device according to claim 12, wherein a stop piece is provided on the mask, and the stop piece is provided above the spring sheet and is configured for preventing deformation of the button.

14. The display device according to claim 1, wherein a mask for securing a circuit board mounted inside the housing is mounted inside the housing, the mask is provided with a spring sheet disposed corresponding to the hook portion, and the spring sheet is configured for maintaining elasticity of the hook portion.

15. The display device according to claim 14, wherein a stop piece is provided on the mask, and the stop piece is provided above the spring sheet and is configured for preventing deformation of the button.

16. The display device according to claim 1, wherein the connecting piece is fixed on one end of the support stand by screws, and the other end of the support stand is mounted on a base.

17. The display device according to claim 1, wherein the connecting piece is rotationally connected with the hanging piece via a rotating shaft.

* * * * *